United States Patent [19]

Hiedecker et al.

[11] 3,947,886

[45] Mar. 30, 1976

[54] FLEXIBLE DISC RECORDING APPARATUS

[75] Inventors: Robert F. Hiedecker, Longmont; A. Kenneth Johnson; Galen B. Royer, both of Boulder, all of Colo.

[73] Assignee: Dynastor, Inc., Denver, Colo.

[22] Filed: Apr. 25, 1974

[21] Appl. No.: 464,054

[52] U.S. Cl. .................... 360/99; 360/86; 360/105; 360/133
[51] Int. Cl.² G11B 5/82; G11B 21/08; G11B 17/26
[58] Field of Search ......... 360/86, 99, 135, 97, 133, 360/98, 101, 105

[56] References Cited
UNITED STATES PATENTS

| | | | |
|---|---|---|---|
| 3,208,056 | 9/1965 | Pearson et al. | 360/99 |
| 3,688,285 | 8/1972 | Lawrence et al. | 360/99 |
| 3,772,665 | 11/1973 | Hertrich | 360/97 |
| 3,812,534 | 5/1974 | Rousseau | 360/98 |

*Primary Examiner*—Stuart N. Hecker
*Attorney, Agent, or Firm*—Reilly and Hancock

[57] ABSTRACT

In electromagnetically reading or writing information on a flexible recording medium, commonly referred to as a "floppy" disc, a read/write head is permanently secured for translational movement with respect to each of a succession of discs which are brought into position beneath the head, the disc being rotated until its recording surface is raised into close proximity to the head for reading and writing information thereon. An airflow pattern is established between the disc and a flat reference plate to form an air bearing interface therebetween which will maintain the disc in a flat plane of rotation directly beneath the head. A second air bearing is formed between the head and the disc to maintain a slight, precise separation therebetween so as to prevent direct contact in close proximity between the head and disc to facilitate electromagnetic recording.

12 Claims, 7 Drawing Figures

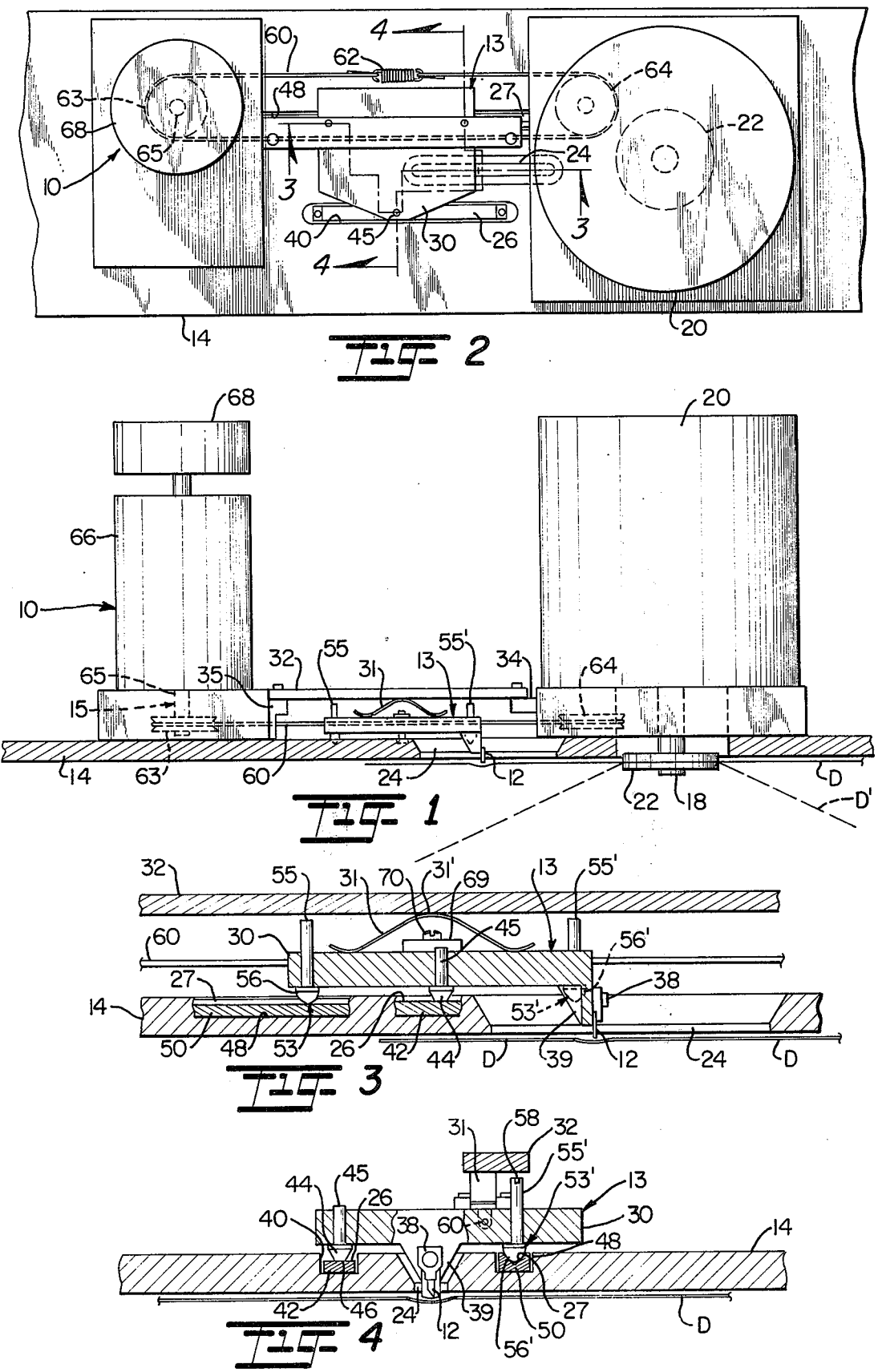

FLEXIBLE DISC RECORDING APPARATUS

This invention relates to a disc storage unit, and more particularly relates to a novel and improved method and means for mounting a recording head with respect to a series of flexible recording discs which are successively brought into registration with the head.

Flexible or "floppy" discs are becoming increasingly popular as a storage medium in the data processing field. Typical applications are as data-entry buffers, program loaders and mini-computer mass memories. Generally, the flexible disc memories take the form of an extremely thin sheet of plastic, such as, Myler which is coated with a magnetic oxide and is provided with a centrol opening for mounting on a drive spindle. When not rotated the flexibility of the disc is such that it will tend to sag or fold downwardly from its center. However, under sufficiently high speeds of rotation, for example, in excess of 900 rpm, the centrifugal force will raise the disc into a flat plane of rotation. Usually the disc is mounted in a disc cartridge provided with an opening through which a head can be positioned in close proximity to the recording surface sufficient for reading or writing information from or onto the recording surface of the disc. In the past, however, difficulties have attended the use of floppy discs for data storage, particularly with respect to precise registration of the read/write head with respect to the disc, so as to precisely control disc medium to head spacing and/or wear or damage to the disc and the head due to contact between the disc and head during operation. Also, introduction of contaminants to the disc surface during the process of loading the disc into the disc drive due to the disc medium being exposed to ambient conditions, and damage to the disc itself during normal handling due to the disc cartridge not providing adequate protection from operator handling have been problems.

In addition, in the conventional moving head disc drives which offer high reliability of operation and long recording medium life, in particular those units using the "flying head" technology, it has been necessary to provide special mechanical and electronic interlock hardware to retract or unload the recording head from the disc before the rotational velocity of the disc was allowed to decrease or to reach zero, such as, when it is desired to insert another disc or in the event of a power outage.

It is therefore desirable to provide a disc drive for flexible disc recording mediums in which the recording head can be precisely positioned with respect to the disc such that the spacing between the recording head and the plane of rotation of the flexible disc is precisely controlled, and in such a way as to obviate movement of the head into and away from registration with each different disc as it is loaded and unloaded. At the same time, it is important that proper orientation be automatically established and maintained between the recording head and the spin axis of each different disc so that the magnetic recording gap of the head is precisely aligned on a radial line originating at the center of the drive axis of the disc. It is also desirable that the disc drive accommodate a disc cartridge that can be inserted into the disc drive and the disc medium loaded onto the drive spindle without exposing the disc medium to ambient conditions and that the disc medium, when spinning at high rotational velocity, not contact the recording head but be in close proximity to the recording head sufficient for electromagnetic recording.

It is therefore an object of the present invention to provide for a novel and improved recording apparatus for reading and writing information on a flexible disc recording medium in a positive and reliable manner.

It is a further object of the present invention to establish a unique form of air bearing interface between the read/write head and a disc brought into registration with the head for storage and retrieval of information thereon.

It is a still further object of the present invention to provide a simplified, low cost flexible disc storage unit in which an airflow pattern is formed between the disc and head for most efficient high speed storage and retrieval of information.

It is an additional object of the present invention to provide for a novel and improved guide mechanism for orientation and translational movement of a read/write head with respect to a flexible disc recording medium which will permit ready interchangeability of the disc and further permit close adjustment and orientation of the head with respect to the disc in operation.

It is a further object of the present invention to present a unique and improved means for establishing a precisely controlled air bearing interface between a read/write head and a spinning flexible disc brought into registration with the head so as to maintain a very small and precise separation between the head and disc, preventing relative contact between the head and disc and providing for the storage and retrieval of information.

It is a still further object of the present invention to provide for a disc recording apparatus which eliminates the necessity of head loading and unloading mechanisms and permits the recording head to be isolated from the entry of foreign particles while being capable of movement with respect to a flexible disc recording medium in the storage and retrieval of information on the disc.

In accordance with the present invention, a read/write head is suspended from a movable head carrier for extension through a recording slot which extends radially of a drive spindle for a flexible recording disc. As each flexible disc is mounted on the drive spindle and driven at high speeds of rotation, it is raised into a flat plane of rotation in sufficiently close proximity to the recording head to permit electromagnetic reading and writing of information on the disc. In this way, it is necessary only for the head to be movable in a direction radially of the center axis of the disc recording medium as it traverses the recording surface on the recording medium. A novel form of bearing or suspension arrangement is provided between the head carrier and base plate for the head carrier which enables the head to become self orienting with respect to the disc recording surface so as to precisely adjust the azimuth of the recording head relative to the recording surface.

More specifically, the head carrier is constrained to allow movement of the head only in a direction radially of the center axis of the disc recording medium. A novel form of bearing or suspension arrangement is provided between the head carrier and the base plate for the carrier which precisely registers and orients the head with respect to the disc drive spindle, to which each different disc automatically registers as it is loaded, such that the desired, precise head to disc spacing is achieved and maintained and the magnetic recording gap of the head is aligned with a radial line originating at the center of the disc spindle. The head is permanently in registration with respect to the reference plate and aligned with respect to the spindle. Each different disc, when loaded into the disc drive, is brought into registration with the spindle and mounted on the spindle from beneath the base or reference plate and when spinning at high rotational speeds, the disc stabilizes in a rotational plane just beneath the base plate, obviating the traditional requirement of loading and unloading the head.

The read/write head can therefore be effectively isolated from entry of foreign particles since it obviates removal or exposure of the head each time that a disc is to be replaced. In addition, an important feature of the present invention resides in the manner in which an airflow pattern is created across the upper recording surface of the disc and specifically between the disc, base plate and recording head so as to form an air interface between the disc and undersurface of the base plate as well as between the disc and head itself.

The above and other objects, advantages and features of the present invention will become more readily appreciated and understood from the following detailed description of a preferred embodiment of the invention when taken together with the accompanying drawings, in which:

FIG. 1 is a side elevational view of a preferred form of magnetic head registration unit in accordance with the present invention.

FIG. 2 is a top plan view of the unit shown in FIG. 1.

FIG. 3 is a cross-sectional view taken about lines 3—3 of FIG. 2.

FIG. 4 is another cross-sectional view taken about lines 4—4 of FIG. 2.

Figure 6:
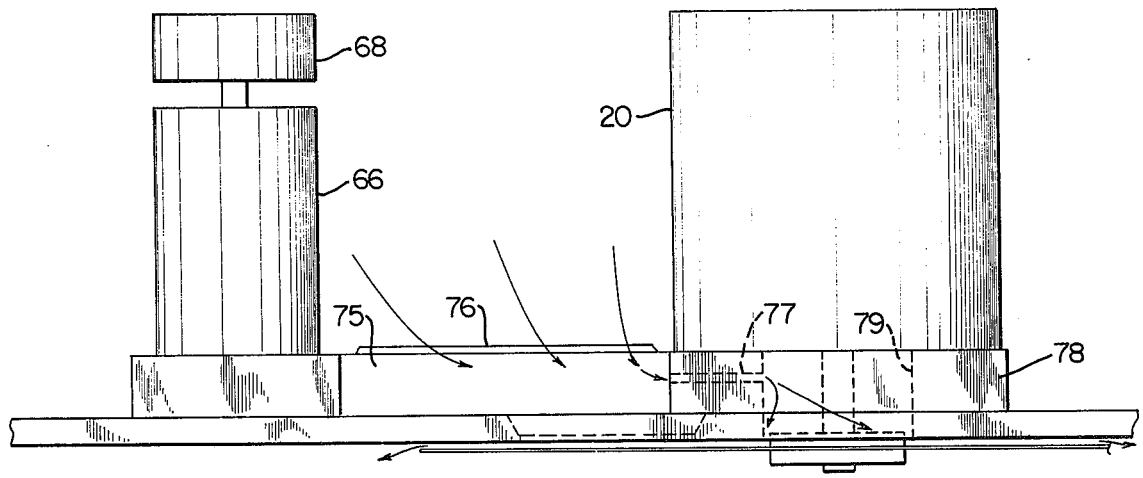
FIG. 6 is a somewhat schematic view illustrating the airflow pattern formed between the magnetic head registration unit and the disc.

Referring in detail to the drawings, there is illustrated in FIGS. 1 and 2 a preferred form of magnetic head registration unit 10 wherein broadly a read/write head 12 is suspended from a head carrier 13, the latter being disposed for advancement along a base or reference plate 14 under the control of a drive mechanism generally designated 15. A flexible disc, as represented at D is mounted on a drive spindle 18 projecting downwardly from a spin motor 20 through the base plate 14 by means of a conventional hub assembly 22. In the relationship established, the flexible disc D may be an extremely thin sheet of plastic which in its normal disposition on the drive spindle 18 would tend to flop or fold downwardly as represented in dotted lines at D'; however, when under high speed rotation by the spin motor 20 the disc will be raised into a flat plane of rotation directly beneath the recording head 12. In turn, the recording head 12 is driven by the carrier through a recording slot 24 in the base plate 14 in a direction radially of the center drive axis of the disc D. The head is guided in its translational movement radially of the drive axis by bearing means between the head carrier 13 and base plate 14, the bearing means including the spaced bearing surface portions 26 and 27 located on opposite sides of and parallel to the recording slot 24 to receive bearing pads, to be hereinafter described, on the head carrier.

Figure 5:
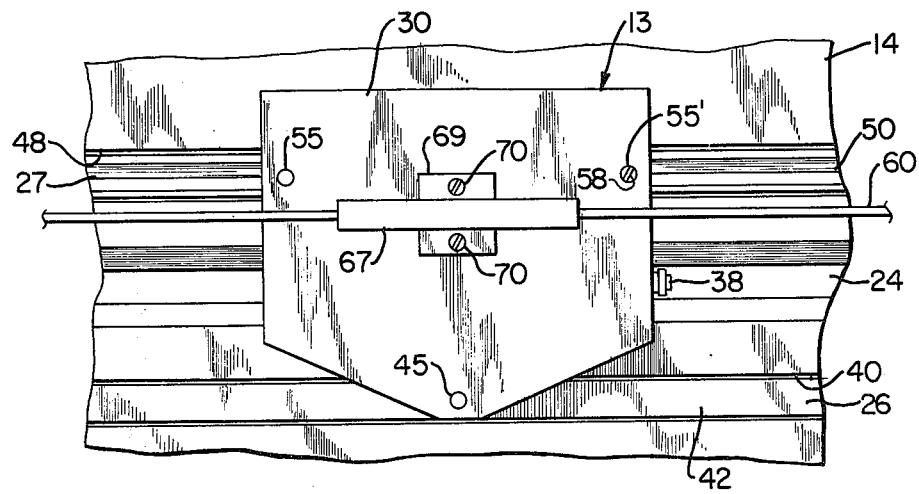
FIG. 5 is a top plan view of the head carrier portion of the magnetic head registration unit.

The head carrier assembly 13 is seen in more detail in FIGS. 3 to 5 to consist of an upper horizontal plate 30 which is spring-loaded downwardly toward the base plate 14 by leaf spring 31. The spring 31 has an upper convex central portion 31' bearing against a stationary load bar 32. Opposite ends of the load bar 32 are affixed to a front limit stop 34 and a rear limit stop 35, each of the limit stops being permanently affixed to the base plate 14 for the purpose of limiting radial movement of the recording head in a manner to be described. The read/write head 12 may suitably be affixed or clamped as at 38 to downward extension 39 at the leading edge of the carrier plate 30 for projection through the recording slot 24 to a point just beneath the under side of the base plate 14.

Referring to the bearing or suspension means between the carrier 13 and base plate 14, the bearing surface portion 26 is formed by a generally rectangular, open slot 40 in the upper surface of the base plate 14, and an elongated bearing plate 42 of rectangular cross-section is positioned in the slot 40 to present an upper flat bearing surface 26. An enlarged circular bearing pad 44 is mounted at the lower end of the support pin 45 which is mounted in the carrier plate 30 for downward extension of the pad 44 into the slot 40. The pad 44 is tapered downwardly and terminates in a slightly curved bearing surface 46 which contacts the upper flat bearing surface 26 in the slot.

On the side of the recording head opposite to the bearing slot 40 a rectangular slot 48 receives a bearing plate 50 which presents an upwardly facing, generally V-shaped bearing surface 27. A pair of front and rear bearing pads 53' and 53, respectively, are aligned for movement along the bearing surface 27. The bearing members 53 and 53' are similar in construction and accordingly like parts are correspondingly enumerated except that those of the front bearing pad are enumerated by prime numbers. Specifically, each bearing pad 53 and 53' is mounted for downward extension from the carrier plate 30 by a support pin 55 and 55', and each pad includes a downwardly convergent, rounded end surface 56 or 56' which is adapted to be received in the V-shaped bearing surface 27 so as to ride along the sides of the bearing surface, as best seen in FIG. 4. The V-shaped bearing surface 27 will in cooperation with the bearing members 53 and 53' guide the head carrier 13 in its radial path of movement such that the magnetic recording gap of the recording head core 12 moves precisely on a radial line from the centerline of the spindle 18 extending through the recording slot 24. The magnetic recording gap of the head 12 is aligned with the radial line by means of an adjustment feature on rear bearing member 53. Rear bearing member 53 eccentrically mounted with respect to support pin 55, and a screwdriver slot 58 or other suitable means of rotation on pin 55 permits adjustment of the carrier 13 relative to the recording head 12 so as to precisely align the magnetic recording gap of the read/write head 12 with respect to the aforementioned radial line. Thus, rotation of the rear bearing 53 will cause lateral or horizontal shifting of the head carrier 13 about the front bearing pad 53' until the magnetic recording gap of the head 12 is stationed directly along the radial line extending from the axis of the drive spindle. The width of the bearing surface 26 is such as to permit the pad 45 to shift laterally with respect to the bearing surface.

The drive mechanism 15 may be suitably comprised of an endless drive cable 60 having a take-up spring 62, and the cable is trained for advancement over a drive pulley 63 and driven pulley 64. Drive pulley 63 is keyed for rotation on a motor drive shaft 65 extending from a conventional form of DC drive motor 66, the latter being provided with an inertia wheel 68. As shown in FIGS. 3 to 5, an intermediate length of the cable between the pulley 63 and 64 extends through a sleeve 67 which is provided with a mounting plate extension 69 affixed by suitable screws 70 to the upper surface of the carrier plate 30. The sleeve 67 is clamped over the cable to anchor the cable to the sleeve whereby rotation of the drive pulley 63 will impart linear movement from the cable 60 and sleeve 68 to the head carrier 13 and head 12. Suitable circuit control means, not shown, and which form no part of the present invention, may be utilized to control the motor 66 to reversibly drive the head carrier and head in a linear direction so as to position the head at any desired location between the limit stops 34 and 35.

The maximum speed of travel of the head through its recording slot 24 is dictated by the speed of rotation of the disc in establishing the air bearing interface, as previously described, between the head and disc. Accordingly, as the disc is rotated by its spin motor 20 the head is advanced radially along the disc at the predetermined speed designated until it reaches any specified point on the recordable surface of the disc. After the disc is removed from engagement or registration with the head, the head may be advanced or reversed to another point, or reversed and returned to its starting point adjacent to the limit stop 35.

The airflow pattern which is established between the disc and head is illustrated somewhat schematically in FIG. 6 for the preferred embodiment of the present invention shown in FIGS. 1 through 5. As shown, a casing 75 is mounted on the base plate 14 to completely cover the read/write head 12, carrier 13 and that portion of the drive mechanism 15 extending between the drive pulley 63 and driven pulley 64. Spinning of the disc D induces air to flow downwardly through an air intake having a filter represented at 76 on the topcover portion of the casing 75. The air is then constrained to flow through a small diameter air control orifice 77 located in mounting block 78 for the spin motor 20, the orifice establishing communication between the interior of the casing 75 and the central cavity area 79 surrounding the drive spindle 18 between the spin motor 20 and the hub assembly 22 for the disc D and limiting the volume rate of flow into the cavity. From the central cavity 79 the air is drawn past hub assembly 22 and between the upper surface of the disc D and undersurface of the base plate 14 to establish a primary air bearing interface therebetween. The limited space between the disc D and base plate 14 will cause a substantial reduction in pressure of the air and greatly increased velocity whereby the differential pressure between the upper and lower surfaces of the disc will aid in maintaining the disc in a flat plane of rotation and in close proximity to the undersurface of the base plate. In addition, a secondary air bearing interface is formed between the upper surface of the disc and the read/write head 12, as illustrated in FIGS. 1, 3 and 4, the disc being sufficiently flexible to be deflected downwardly a slight degree in that area directly beneath the head.

Figure 7:
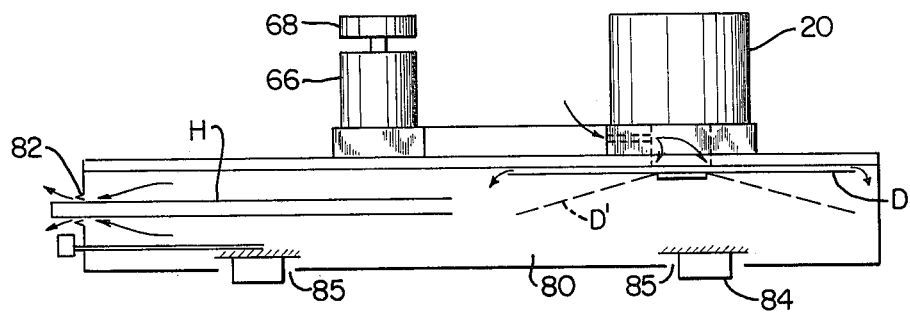
FIG. 7 is another schematic view illustrating disc cartridge receiver mounted beneath the head registration unit and the airflow pattern established therethrough.

In the form of invention illustrated in FIG. 7 a disc receiver housing 80 is affixed to the underside of the base plate 14 and is adapted to receive a disc cartridge H for the purpose of loading a disc D onto the drive spindle of the spin motor 20. The head registration system and drive mechanism are identical to that disclosed in the embodiment of FIGS. 1 to 5, the modification residing solely in utilization of a receiver housing 80 by which a disc may be inserted into position beneath the head by a disc cartridge. The particular form of loading mechanism for the disc cartridge forms no part of the present invention and therefore is not described. Suffice it to say that the disc cartridge may be inserted through a cartridge slot represented at 82 which may also serve as an air outlet for air during the recording operation. In addition, feet 84 for the housing may have limited air spaces represented at 85 to permit discharge of air therethrough. The airflow pattern established through the cover casing 75 and filter intake 76 through air control orifice 77 and across the upper surface of the disc is identical to that described with reference to FIG. 6 where according to Bernoulli's principle, a differential pressure is established on opposite sides of the disc to assure precise alignment of the disc in a flat plane of rotation directly adjacent to the undersurface of the base plate. As a result, due to the natural laws that control the characteristics of a spinning flexible disc in close proximity to a flat surface, when the spin motor 20 is activated, the disc will seek its stable spinning position beneath the base plate without contacting either the base plate or the recording head 12 projecting through the slot 24.

In the system described, while the rotation of the disc at relatively high speeds will raise it into a flat plane of rotation, the differential pressure established on opposite sides of the disc is essential to maintain the disc in a flat plane of rotation. As stated, the air is directed from the air intake through the air control orifice 77, which reduces the volume of airflow passing across the upper surface of the disc. In this connection, the size of air control orifice will determine flatness of plane of rotation as well as head to disc spacing. In the limited space formed between the disc and base plate, the air velocity is increased so that a greater pressure is applied beneath the disc maintaining it in a flat plane of rotation and in closely spaced relation to the base plate. For the purpose of illustration, for a disc which is driven at a speed of 3600 rpm by the spin motor 20, the space established between the base plate and disc may be on the order of 10 mils and the size of the orifice 77 may be on the order of 1/16 inch diameter.

From the foregoing, whether the disc is rigidly attached to the motor drive spindle 18 by the hub assembly or is done automatically, the recording head 12 can be attached to the head carrier and advanced along the recording slot to read or write information on the disc under the control of the drive mechanism 15. Of course if desired, one or more heads may be mounted in different fixed positions for projection through the base plates at different radial and angular locations for reading or writing information on one or more recording discs. In the manner described, the system eliminates costly mechanisms required for loading and unloading the recording head.

It will be understood that while the preferred form of the invention has been illustrated and described, changes in construction and arrangement may be made without departing from the spirit and scope of the invention as defined by the appended claims.

What is claimed is:

1. In a magnetic head positioning apparatus for reading and writing information, the combination comprising:

drive means having a drive shaft extending therefrom, a reference plate having said drive means attached in fixed relation on one side thereof with said drive shaft extending axially through a port located centrally of said reference plate, said reference plate having an elongated slot therethrough positioned in spaced relation from said port but radially oriented relative thereto, and said port communicating with an air flow orifice adjacent to said port, a flexible disc recording medium, a read/write head, a head carrier mounted on said one side of said reference plate and including bearing means supporting said head for extension through said elongated slot for linear movement over a selected distance corresponding to the radial distance of the recordable surface on said flexible disc recording medium, means for securing said flexible disc recording medium on said drive shaft into position adjacent to a flat surface portion on the other side of said reference plate opposite to said head carrier and into operative engagement with said drive means whereby to spin said disc at a speed sufficient to raise said disc into a substantially flat plane of rotation in proximity to the flat surface on the other side of said reference plate, a housing having an opening thereinto but otherwise being attached to said reference plate in air-tight enclosing relation to said reference plate slot and the intake of said air flow orifice, air filter means covering said housing opening, and means establishing a flow of air from said one side of said reference plate through said reference plate port for establishing a first air bearing interface between said disc and the flat surface of said reference plate to maintain said disc in its flat plane of rotation in close proximity to said reference plate and to establish a second air bearing interface between said disc and said head to establish a slight spacing therebetween in reading and writing information on said recording medium.

2. In the magnetic head positioning apparatus according to claim 1, said reference plate including a pair of spaced bearing surface portions on said one side thereof extending in a direction parallel to and on each side of said slot, one of said bearing surface portions being generally V-shaped and the other being flat, and spaced bearing members on said head carrier including a pair of first bearing members provided with forwardly convergent bearing surfaces adapted to be received by said V-shaped bearing surface and a second bearing member provided with a downwardly facing, slightly curved bearing surface aligned with the flat bearing surface portion on said base plate, at least one of said first bearing members being eccentrically mounted by a support member in said head carrier.

3. In a magnetic head positioning apparatus according to claim 1, including means for applying a continuous closure force to said head carrier toward said one side of said reference plate, said bearing means including spaced bearing surface portions in the upper surface of said one side of said reference plate extending in a direction parallel to said reference plate slot, and bearing members on said head carrier movable along said bearing surface portions.

4. In the magnetic head positioning apparatus according to claim 3, including a cross bar attached in fixed relation to said reference plate on said one side thereof spaced so as to overlie said slot, said closure force applying means including spring means attached between said head carrier and said cross bar for exerting a biasing force therebetween.

5. In the magnetic head positioning apparatus according to claim 3, one of said bearing surface portions being of generally V-shaped cross-section, and at least two bearing members riding in said generally V-shaped bearing surface and having forwardly convergent sides contacting the divergent sides of said V-shaped bearing surface.

6. In the magnetic head positioning apparatus according to claim 5, another of said bearing surface portions being defined by a flat bearing surface, at least one other bearing member having a flat leading end surface riding on the flat bearing surface.

7. A flexible disc recording apparatus for reading and writing information on a flexible disc recording medium, comprising in combination:

a base plate, a disc drive motor attached to a first side of said base plate and including a drive shaft projecting downwardly through said base plate, a read/write head, a head carrier mounting said head on said first side of said base plate for extension downwardly through a recording slot in said base plate for a limited distance, bearing means between said head carrier and said base plate supporting said head for linear movement over a predetermined distance radially toward and away from the axis of said drive shaft and for a distance corresponding to the radial distance of the recordable surface on the disc recording medium, selectably operable head drive means attached to said first side of said base plate for linearly moving said head carrier for radially positioning said head in said recording slot relative to the axis of said drive shaft, limit stop means attached to said base plate at opposite ends of said recording slot for limiting the distance of movement of said head under the control of said head drive means, biasing means including a stationary member attached in fixed relation to said base plate and positioned in spaced relation above said head carrier and a spring member interposed between said stationary member and said head carrier, means for mounting said flexible recording disc on said drive shaft beneath said read/write head and on the side of said base plate opposite to said first side whereby upon energization of said disc drive motor said disc is driven at a speed sufficient to raise said disc into a flat plane of rotation in close proximity to said head, and airflow means including air intake means mounted on said base plate having an air-controlled orifice for establishing a flow path of air downwardly through said base plate and across the upper surface of said disc between said disc and said base plate to form a bearing surface therebetween.

8. A flexible disc recording apparatus according to claim 7, including a disc receiver housing positioned beneath said base plate, said disc receiver housing provided with an outlet means to exhaust air passing into said housing by said airflow means.

9. A flexible disc recording apparatus according to claim 8, said bearing means for said head carrier being adjustable to align said head with a radial line extending from the axis of said drive shaft bisecting said recording slot.

10. A flexible disc recording apparatus for reading and writing information on a flexible disc recording medium, comprising in combination:

a base reference plate, a disc drive motor attached to a first side of said plate and including a drive spindle projecting downwardly through said base plate, a read/write head, a head carrier on said first side of said plate mounting said read/write head for extension downwardly through a recording slot in said base plate and for a limited distance beneath said base plate, bearing means between said head carrier and said base plate being operative to guide said head for linear movement over a predetermined distance rearwardly toward and away from the center of said drive spindle and for a distance corresponding to the radial distance of the recordable surface on the disc recording medium, said bearing means including a pair of spaced bearing surface portions on said base plate extending in a direction parallel to the direction of movement of said head, one of said bearing surface portions being generally V-shaped and the other being flat, and spaced bearing members on said head carrier including a pair of bearing members provided with forwardly convergent bearing pads adapted to be received by said V-shaped bearing surface and a bearing pad provided with a downwardly facing slightly curved bearing surface aligned with the flat bearing surface portion on said base plate, said bearing means further including means for adjusting the position of one of said bearing pads in a direction transverse to the associated said V-shaped bearing surface for aligning said read/write head in a radial direction in said recording slot, support means for mounting said flexible recording disc on said drive spindle beneath said read/write head whereby upon energization of said disc drive motor said disc is driven at a speed sufficient to raise said disc into a flat plane of rotation on the other side of said plate and in close proximity to said head, and air delivery means establishing a flow path of air downwardly through said base plate and across the upper surface of said disc between said disc and said base plate to form a bearing interface therebetween.

11. A flexible disc recording apparatus according to claim 10, said air delivery means including an air intake mounted on said first side of said base plate and an air passage in communication with said air intake for directing air downwardly through said base plate adjacent to said drive spindle and outwardly between said disc recording medium and the said other side of said base reference plate.

12. A flexible disc recording apparatus according to claim 11, including a housing enclosing said head and said head carrier, said air intake being located in said housing and provided with an air filter.

* * * * *